United States Patent
Cohen et al.

(10) Patent No.: US 6,928,562 B2
(45) Date of Patent: Aug. 9, 2005

(54) METHOD AND SYSTEM FOR MANAGING POWER IN A SYSTEM HAVING AN INTERNAL USB HUB

(75) Inventors: Mark Evan Cohen, Cary, NC (US); James Christopher Loebach, Raleigh, NC (US); Carl Joseph Muti, Jr., Raleigh, NC (US); Thomas Wayne Studwell, Chapel Hill, NC (US); Osamu Yamamoto, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 09/802,659

(22) Filed: Mar. 9, 2001

(65) Prior Publication Data

US 2002/0138776 A1 Sep. 26, 2002

(51) Int. Cl.[7] .............................................. G06F 1/26
(52) U.S. Cl. ........................ 713/320; 713/323; 713/324; 710/313
(58) Field of Search ................................ 713/300, 320, 713/323, 324; 710/8, 64, 300, 305, 313; 703/13, 18, 21

(56) References Cited

U.S. PATENT DOCUMENTS

| 5,167,024 | A | | 11/1992 | Smith et al. | ................. | 713/322 |
|---|---|---|---|---|---|---|
| 5,675,813 | A | | 10/1997 | Holmdahl | ................. | 713/310 |
| 5,799,196 | A | | 8/1998 | Flannery | ................. | 713/320 |
| 6,216,188 | B1 | * | 4/2001 | Endo et al. | ................. | 710/302 |
| 6,279,060 | B1 | * | 8/2001 | Luke et al. | ................. | 710/64 |
| 6,415,342 | B1 | * | 7/2002 | Wahl et al. | ................. | 710/100 |
| 6,493,770 | B1 | * | 12/2002 | Sartore et al. | ................. | 710/8 |
| 6,671,814 | B1 | * | 12/2003 | Kubo et al. | ................. | 713/324 |

* cited by examiner

*Primary Examiner*—Thuan Du
(74) *Attorney, Agent, or Firm*—Charles Bustamante; Sawyer Law Group LLP

(57) ABSTRACT

A method and system for managing power in a computer system is disclosed. The computer system includes a host. The method and system include providing a Universal Serial Bus (USB) hub, at least one USB connector and attach/removal detection logic. The at least one USB connector is coupled with the USB hub. The attach/removal detection logic is coupled with the USB hub. The attach/removal detection logic determines whether a USB device is connected to the at least one USB connector, logically decouples the USB hub from the host if the USB device is not connected to the at least one USB connector and logically couples the USB hub to the host if the USB device is connected to the at least one USB connector.

10 Claims, 3 Drawing Sheets

METHOD AND SYSTEM FOR MANAGING POWER IN A SYSTEM HAVING AN INTERNAL USB HUB

FIELD OF THE INVENTION

The present invention relates to computer systems, and more particularly to a method and system for managing power in a system having an internal USB hub.

BACKGROUND OF THE INVENTION

Universal Serial Bus ("USB") connections are of increasing popularity in computer systems. FIG. 1 depicts a conventional computer system 10 that has USB connectors. The conventional computer system 10 could be a number of computer systems, including for example, a notebook computer or desk top computer. The conventional computer system 10 includes a host 12, a first USB connector 14, a USB hub 16, USB connectors 18 and 20 and a power supply 22. The host 12 includes the integrated circuits and, therefore, the processor (not explicitly shown) that operate the operating system (not explicitly shown) for the computer system 10. For example, the host 12 might include four INTEL™ integrated circuits. Thus, the host 12 might include INTEL™ processors which run a MICROSOFT™ operating system. The conventional computer system 10 also includes the USB connector 14. The conventional computer system 10 could include another USB connector (not explicitly shown) and operate as desired. Due to the popularity of USB connectivity, the conventional computer system 10 is desired to have a larger number of USB connectors. Consequently, the USB hub 16 that connects the host 12 to USB connectors 18 and 20 is provided. Thus, the USB hub 16 allows additional USB connectors 18 and 20 to be integrated into the computer system 10. In order to operate, the USB hub may connected to and be supplied with power from the power supply 22. Typically, the conventional computer system 10 includes the components 12, 14, 16, 18, 20 and 22 integrated into a housing.

Although the conventional computer system 10 functions, one of ordinary skill in the art will readily realize the conventional computer system 10 may use a higher amount of power than desired. For certain operating systems and processors, such as the MICROSOFT™ operating system and certain INTEL™ processors, use of a USB device attached to a USB connector precludes the processor from entering a lowest power state, known as a C3 state. In other words, because of certain USB host implementations, if the operating system for the host 12 detects the presence of a USB device then the processor cannot enter its lowest power state. In the conventional computer system 10, and as required by USB specifications, the operating system in the host 12 considers the USB hub 16, which is integrated into the conventional computer system 10, to be a USB device. Consequently, a USB device is always detected, even when no external USB devices are utilized. As a result, processors in the host 12 will never be able to enter the lowest power state. The conventional computer system 10 may, therefore, consume more power than is desirable. This is a particular problem if the conventional computer system 10 is a computer system, such as a notebook, that has a mobile mode. In such a computer system, the power supply 22 includes a battery for supplying power to the conventional computer system 10 when in mobile mode. When in the mobile mode, it is desirable to allow the host 12 to enter a lowest power state in order to conserve battery power, for example when the host 12 is not actively being used. Because the processors in the host 12 cannot enter the lowest power state, the battery will discharge more rapidly. The battery may lose its charge, preventing the user from utilizing the conventional computer system 10 when desired.

Accordingly, what is needed is a system and method for providing a system that allows a computer system having a USB hub to manage power. The present invention addresses such a need.

SUMMARY OF THE INVENTION

The present invention provides a method and system for managing power in a computer system. The computer system includes a host. The method and system comprise providing a Universal Serial Bus (USB) hub, at least one USB connector and attach/removal detection logic. The at least one USB connector is coupled with the USB hub. The attach/removal detection logic is coupled with the USB hub. The attach/removal detection logic determines whether a USB device is connected to the at least one USB connector, logically decouples the USB hub from the host if the USB device is not connected to the at least one USB connector and logically couples the USB hub to the host if the USB device is connected to the at least one USB connector.

According to the system and method disclosed herein, the present invention allows power to be managed in the computer system by allowing processors in the host to go to a lower power state.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

A conventional computer system may include a host, a USB hub and multiple USB connectors integrated into a single unit. The host typically includes one or more integrated circuits, including at least one processor, that run an operating system ("OS") for the conventional computer system. Because USB devices enjoy increased popularity, the USB hub is coupled with the host. Coupled to the USB hub are multiple USB connectors that allow USB devices to be coupled to the conventional computer system. Although such a conventional computer system allows a larger number of USB devices to be used with the conventional computer system, one of ordinary skill in the art will realize that the conventional computer system may not be able to adequately manage power. In particular, the conventional computer system, as required by USB specifications, considers the USB hub to be a USB device connected to the conventional computer system. Consequently, processors in the host of the conventional computer system cannot enter certain power states. As a result, the conventional computer system may consume more power than is desired.

The present invention provides a method and system for managing power in a computer system. The computer system includes a host. The method and system comprise providing a Universal Serial Bus (USB) hub, at least one USB connector and attach/removal detection logic. The at least one USB connector is coupled with the USB hub. The attach/removal detection logic is coupled with the USB hub. The attach/removal detection logic determines whether a USB device is connected to the at least one USB connector, logically decouples the USB hub from the host if the USB device is not connected to the at least one USB connector and logically couples the USB hub to the host if the USB device is connected to the at least one USB connector.

The present invention will be described in terms of certain components and OSs and particular numbers of components. However, one of ordinary skill in the art will readily recognize that this method and system will operate effectively for other components, other OSs and other numbers of components. In addition, for the purposes of clarity, many portions of the computer system in accordance with the present are omitted.

Figure 1:
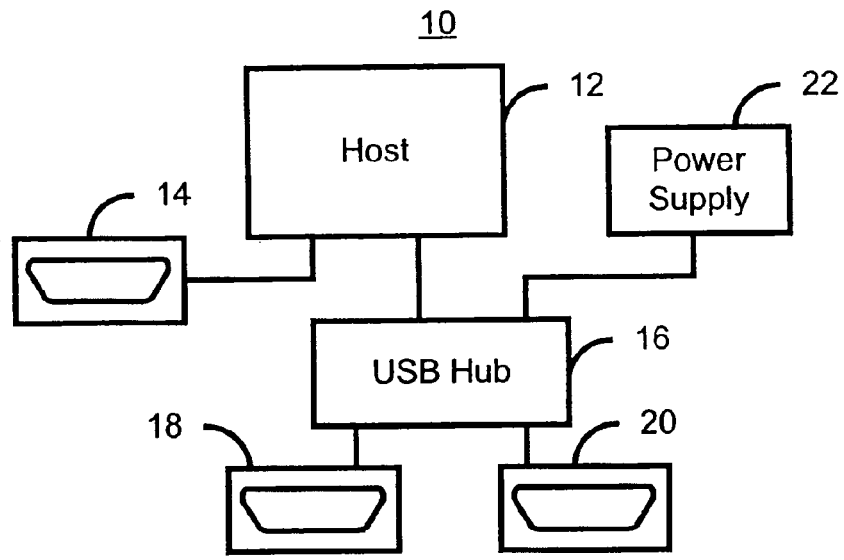
FIG. 1 is a block diagram of a conventional computer system having a USB hub.
Figure 2:
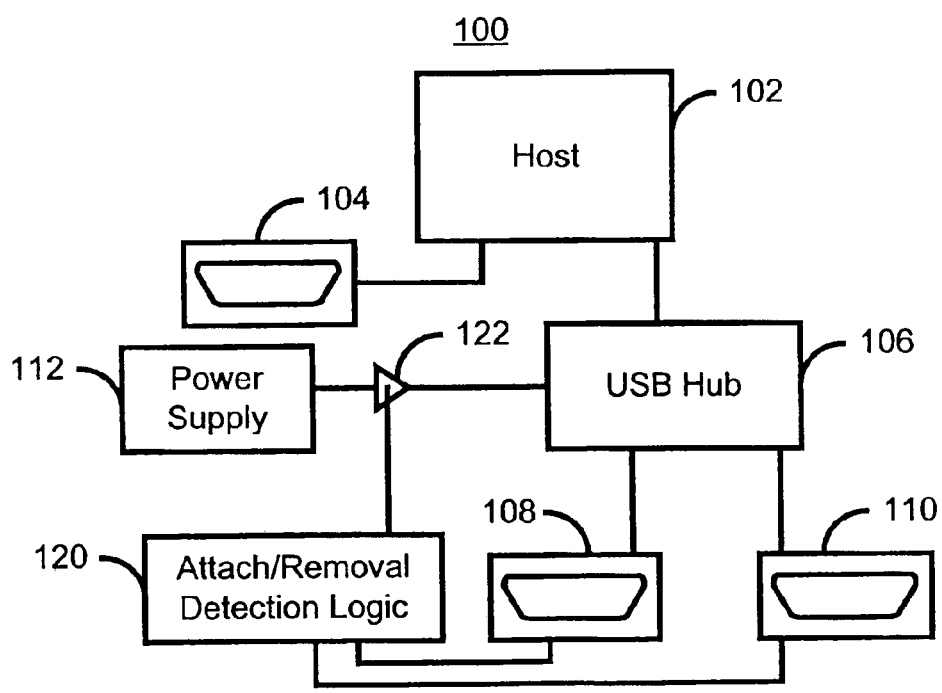
FIG. 2 is a block diagram of one embodiment of a computer system in accordance with the present invention having a USB hub.

To more particularly illustrate the method and system in accordance with the present invention, refer now to FIG. 2. FIG. 2 is a high-level block diagram that depicts one embodiment of a computer system 100 in accordance with the present invention. The computer system 100 includes a host 102, a first USB connector 104, a USB hub 106, USB connectors 108 and 110 connected to the USB hub 106, a power supply 112 coupled with the USB hub 106, attach/removal detection logic 120 and connector 122. The host 102, the first USB connector 104, the USB hub 106, the USB connectors 108 and 110 and the power supply 112 are preferably substantially the same as the host 12, the first USB connector 14, the USB hub 16, the USB connectors 18 and 20 and the power supply 22 of the conventional system 10 depicted in FIG. 1.

Referring back to FIG. 2, the attach/removal detection logic 120 is coupled with the USB connectors 108 and 110 and with the power supply 112 and USB hub 108 through the connector 122. The attach/removal detection logic 120 detects whether a USB device (not shown) is plugged into either of the USB connectors 108 and 110. The attach/removal detection logic 120 functions to logically decouple the USB hub 106 from the host 102 if a USB device is not connected any of the USB connectors 108 and 110. In addition, the attach/removal detection logic 120 also logically couples the USB hub 106 to the host 102 if a USB device is coupled to any of the USB connectors 108 and 110. The attach/removal detection logic 120 does this by controlling the connector 122. In particular, the attach/removal detection logic 120 controls the connector 122 so that the connector 122 couples the USB hub 106 to the power supply 112 when a USB device is coupled to either of the USB connectors 108 and 110 and so that the connector 122 does not couple the USB hub 106 to the power supply 112 when the USB device is not coupled to either of the USB connectors 108 and 110. Thus, power is only supplied to the USB hub 106 when one or more of the USB connectors 108 and 110 provided through the USB hub 106 is in use.

Using the attach/removal detection logic 120, the computer system 100 can better manage power. The operating system of the host 102 can only recognize the USB hub 106 if power is supplied to the USB hub 106. Because the attach/removal detection logic 120 and the connector 122 ensure that the power supply 112 is connected to the USB hub 106 only when one or more of the USB connectors 108 and 110, the operating system can only recognize the USB hub 106 when a USB device is connected to one or more of the USB connectors 108 and 110. In other words, the USB hub 106 is logically decoupled from the host 102 when a USB device is not coupled to either of the USB connectors 108 and 110. Similarly, the USB hub 106 is logically coupled to the host when a USB device is connected to one or more of the USB connectors 108 and 110. This is true even though the USB hub 106 remains physically connected to the host 102 at all times. Thus, the operating system for the host 102 only considers the USB hub 106 to be a USB device coupled to the host 102 when one or more of the USB connectors 108 and 110 are in use. When these connectors are not in use, therefore, the processors for the host 102 can enter a lowest power state. Thus, power will not be utilized unnecessarily due to the presence of the USB hub 106. Therefore, power for the computer system 100 can be better managed.

Figure 3:
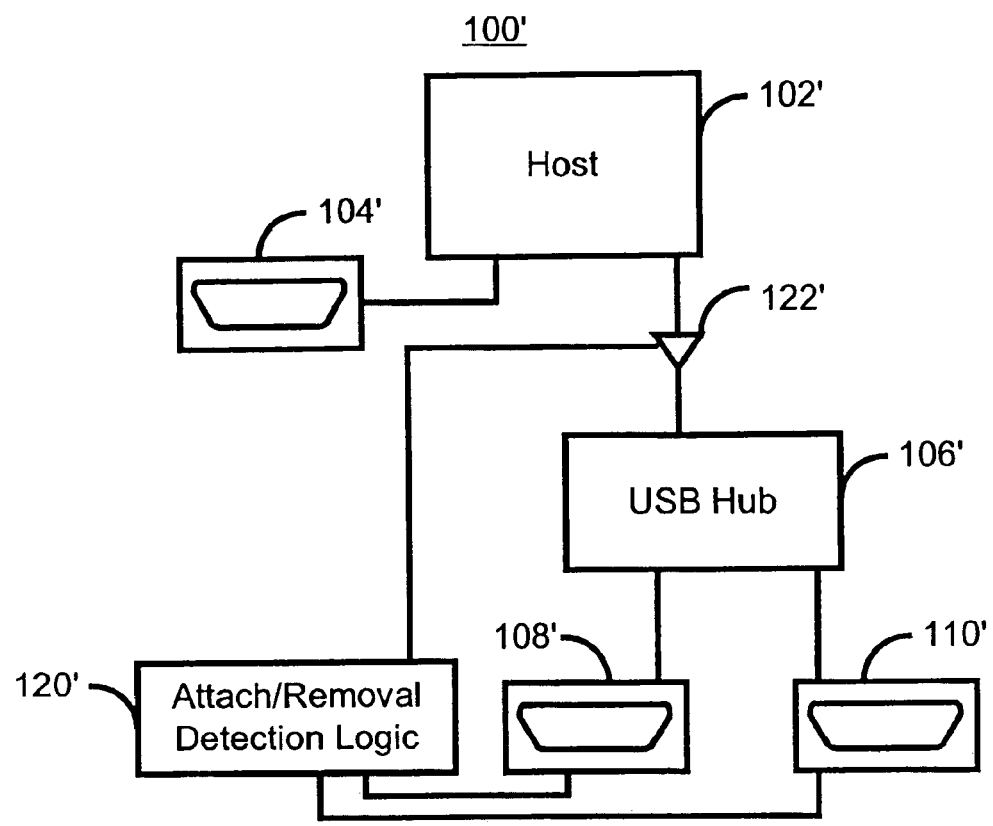
FIG. 3 is a block diagram of a second embodiment of a computer system in accordance with the present invention having a USB hub.

FIG. 3 is a block diagram of a second embodiment of a computer system 100' in accordance with the present invention having a USB hub. The computer system 100' includes analogous components to those in the computer system 100. Consequently, these items are labeled similarly. However, for clarity, certain components are not depicted. The computer system 100' includes a host 102', a USB connector 104' connected to the host 102', a USB hub 106', and USB connectors 108' and 110' coupled to the USB hub 106'. The computer system 100' also includes attach/removal detection logic 120' and connector 122'. However, in the computer system 100', the connector 122' is coupled between the host 102' and the USB hub 106'. The attach/removal detection logic 120' still logically decouples the USB hub 106' from the host 102' if a USB device is not connected any of the USB connectors 108' and 110'. The attach/removal detection logic 120' also logically couples the USB hub 106' to the host 102' if a USB device is coupled to any of the USB connectors 108' and 110'. The attach/removal detection logic 120' performs these functions by controlling the connector 122'. In particular, the attach/removal detection logic 120' controls the connector 122' so that the connector 122' couples the USB hub 106' to the host 102' when a USB device is coupled to either of the USB connectors 108' and 110'. In addition, the attach/removal detection logic 120' controls the 122' so that the connector 122' does not couple the USB hub 106' to the host 102' when the USB device is not coupled to either of the USB connectors 108' and 110'.

Using the attach/removal detection logic 120', the computer system 100' can better manage power. The operating system of the host 102' can only recognize the USB hub 106' if the host 102' is coupled to the USB hub 106'. Because the attach/removal detection logic 120' and the connector 122' couples the USB hub 106' to the host 102' only when one or more of the USB connectors 108' and 110', the operating system can only recognize the USB hub 106 when a USB device is connected to one or more of the USB connectors 108' and 110'. In other words, the USB hub 106' is logically decoupled from the host when a USB device is not coupled to either of the USB connectors 108' and 110'. Similarly, the USB hub 106' is logically coupled to the host when a USB device is connected to one or more of the USB connectors 108' and 110'. Thus, the operating system for the host 102' only considers the USB hub 106' to be a USB device coupled to the host 102' when one or more of the USB connectors 108' and 110' are in use. When these connectors are not in use, therefore, the processors for the host 102' can enter a lowest power state. Thus, power will not be utilized unnecessarily due to the presence of the USB hub 106'. Therefore, power for the computer system 100' can be better managed.

Figure 4:
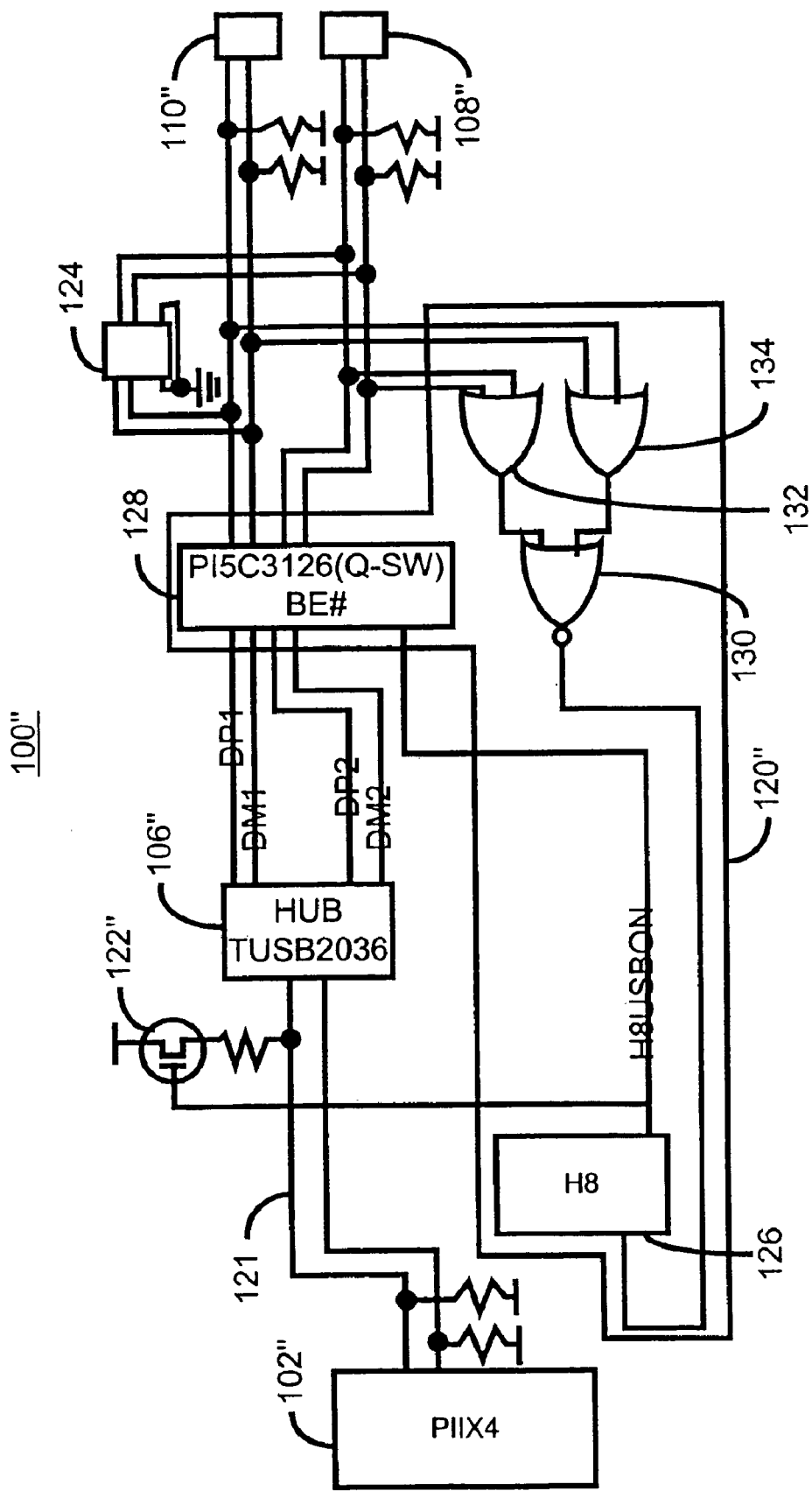
FIG. 4 is a more detailed block diagram of the second embodiment of a computer system in accordance with the present invention having a USB hub.

FIG. 4 is a more detailed block diagram of the second embodiment of a computer system 100" in accordance with the present invention having a USB hub 106". The computer system 100" includes analogous components to those in the computer system 100. Consequently, these items are labeled similarly. However, for clarity, certain components are not depicted. The computer system 100" includes processors 102" which would reside in a host for the computer system 100", a USB hub 106", USB connectors 108" and 110". The computer system 100" also includes attach/removal detection logic 120" and connector 122". Furthermore, the computer system 100" includes a transient suppressor 124. The transient suppressor 124 is used to prevent damage due to electrostatic discharge when a USB device (not shown) is hot attached to one of the connectors 106" and 108". The attach removal detection logic includes integrated circuits 126 and 128 and logic gates 130, 132 and 134. The connector 122" is a FET. Thus, the connector 122" is not a connector in the traditional sense of the word in that the connector 122" does not physically decouple the USB hub 106" from the processors 102". Instead, the connector 122" is a connector in the sense that it allows the USB hub 106" to be logically coupled or decoupled from the processor 102". When a USB device is connected to a USB connector 108" or 110", the attach/removal detection logic 120" provides a signal (H8USBON) that is on. When this signal is on, the FET 122" is turned on. Thus, the line 121 between the processors 102" and the USB hub 106" is driven high when a USB device is connected to one of the connectors 108" or 110". As a result, the USB hub 106" is connected to the processors 102" only when the USB connector 108" or 110" is in use. Thus, the processors 102" only recognize the USB hub 106" as a USB device when the USB connector 108" or 110" is being used. At other times, the processors 102" behave as though the USB hub 106" is not present in the computer system 100". Therefore, the processors 102" can enter a lowest power state when the USB connectors 108" and 110" are not in use. Thus, power can be better managed in the computer system 100".

A method and system has been disclosed for managing power in a system having an internal USB hub. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for managing power in a computer system including a power supply, the computer system including a host, the system comprising:
   a Universal Serial Bus (USB) hub coupled with the power supply;
   at least one USB connector coupled with the USB hub; and
   attach/removal detection logic coupled with the USB hub, the attach/removal detection logic for determining whether a USB device is connected to the at least one USB connector, logically decoupling the USB hub from the host if the USB device is not connected to the at least one USB connector and logically coupling the USB hub to the host if the USB device is connected to the at least one USB connector;
   wherein the power supply is coupled with the USB hub and wherein the attach/removal detection logic disconnects the USB hub from the power supply if the USB device is not connected to the at least one USB connector.

2. The system of claim 1 wherein the attach/removal detection logic is coupled with the host and wherein the attach/removal detection logic disconnects the USB hub from the host if the USB device is not connected to the at least one USB connector.

3. The system of claim 2 wherein the attach/removal detection logic provides a first signal when the USB device is not connected to the at least one USB connector and a second signal when the USB device is connected to the at least one USB connector, the system further comprising:
   a connector coupled with the host, the attach/removal detection logic and the USB hub, the connector for disconnecting the USB hub from the host in response to the first signal and for connecting the USB hub to the host in response to the second signal.

4. The system of claim 1 wherein the attach/removal detection logic provides a first signal when the USB device is not connected to the at least one USB connector and a second signal when the USB device is connected to the at least one USB connector, the system further comprising:
   a connector coupled with the power supply, the attach/removal detection logic and the USB hub, the connector for connecting the USB hub to the power supply in response to the first signal and for disconnecting the USB hub from the power supply in response to the second signal.

5. The system of claim 1 wherein the computer system is allowed to enter a lowest power state when the device is not connected to the at least one USB connector.

6. A method for controlling power in a computer system including a host, a Universal Serial Bus (USB) hub coupled with the host, a power supply coupled with the USB hub, and at least one USB connector coupled with the USB hub, the method comprising:
   (a) determining whether a USB device is connected to the at least one USB connector;
   (b) logically decoupling the USB hub from the host if the USB device is not connected to the at least one USB connector, the logical decoupling step further including
      (b1) automatically disconnecting the USB hub from the power supply using attach/removal detection logic if the USB device is not connected to the at least one USB connector; and
   (c) logically coupling the USB hub to the host if the USB device is connected to the at least one USB connector using the attach/removal detection logic.

7. The method of claim 6 wherein the logically decoupling step (b) further includes:
   (b1) disconnecting the USB hub from the host if the USB device is not connected to the at least one USB connector.

8. The method of claim 7 wherein the disconnecting step (b1) further includes the steps of (b1i) providing a first signal when the USB device is not connected to the at least one USB connector and a second signal when the USB device is connected to the least one USB connector using the attach/removal detection logic, the attach/removal detection logic being coupled with the host and the at least one connector; and (b1ii) using a connector couple with the host, the attach/removal detection logic and the USB hub to disconnect the USB hub from the power supply in response to the first signal and to connect the USB hub to the power supply in response to the second signal.

9. The method of claim 6 wherein the disconnecting step (b1) further includes the steps of (b1i) providing a first signal when the USB device is not connected to the at least one USB connector and a second signal when the USB device is connected to the at least one USB connector using the attach/removal detection logic, the attach/removal detection logic being couple with the power supply and the at least one USB connector; and (b1ii) using a connector coupled with the power supply, the attach/removal detection logic and the USB hub to connect the USB hub to the power supply in response to the first signal and for disconnect the USB hub from the power supply in response to the second signal.

10. The method of claim 6 wherein the computer system is allowed to enter a lowest power state when the device is not connected to the at least one USB connector.

* * * * *